United States Patent [19]
Cox et al.

[11] Patent Number: 5,656,199
[45] Date of Patent: Aug. 12, 1997

[54] TERBIUM OR EUROPIUM ACTIVATED HIGHLY CHARGED FLUOROPHOLOPITE PHOSPHOR

[75] Inventors: James R. Cox, Monroeton; Ronald E. Karam, Towanda, both of Pa.

[73] Assignee: Osram Sylvania Inc., Danvers, Mass.

[21] Appl. No.: 727,103

[22] Filed: Oct. 8, 1996

Related U.S. Application Data

[63] Continuation-in-part of Ser. No. 425,849, Apr. 20, 1995, Pat. No. 5,597,511, which is a continuation-in-part of Ser. No. 189,012, Jan. 28, 1994, abandoned, which is a continuation-in-part of Ser. No. 999,637, Dec. 31, 1992, abandoned.

[51] Int. Cl.$^6$ .............................. C09K 11/61; C09K 11/59
[52] U.S. Cl. .............................. 252/301.4 R; 252/301.4 P; 252/301.4 F
[58] Field of Search ............ 252/301.4 R, 301.4 F, 252/301.4 H

[56] References Cited

U.S. PATENT DOCUMENTS 5,597,511  1/1997  Cox et al. .................. 252/301.4 R

*Primary Examiner*—Melissa Bonner
*Attorney, Agent, or Firm*—William H. McNeill

[57] ABSTRACT

Inorganic intercalation phosphors having either the general formula $Na_2(Mg_{3-x}Tb_x) Al_2Si_2O_{10}F_2$ or $Na_2Mg_3\{(Al_{2-x}Eu_x)Si\}O_{10}F_2$, were made by doping an inorganic, intercalation, highly charged fluorophlogopite compound having an atomic structure interspersed with vacant spaces with selected activator ions such as terbium or europium capable of luminescent emission when excited by external radiation such as cathode rays.

5 Claims, 4 Drawing Sheets

TERBIUM OR EUROPIUM ACTIVATED HIGHLY CHARGED FLUOROPHOLOPITE PHOSPHOR

CROSS-REFERENCE TO RELATED APPLICATIONS

This application is a continuation-in-part of application Ser. No. 08/425,849, filed Apr. 20, 1995, now U.S. Pat. No. 5,597,511, which is a continuation-in-part of Ser. No. 08/189,012, filed Jan. 28, 1994, now abandoned which is a continuation-in-part of application Ser. No. 07/999,637, filed Dec. 31, 1992, now abandoned the disclosures of which are hereby incorporated by reference.

The United States Government has rights in this invention pursuant to U.S. Government Contract No. DAAL01-92-C-0241.

TECHNICAL FIELD

This invention relates to phosphors and methods of making them. In particular, it relates to inorganic intercalation phosphors made by doping inorganic intercalation compounds with selected activator ions which, when excited by ultraviolet light, cathode rays or other exciting radiation, are capable of luminescent emission. Still more particularly, it relates to terbium or europium activated, highly charged fluorophiogopite (HCFP).

BACKGROUND ART

Phosphors are critical components in a number of lamp types, electroluminescent devices, and cathode ray tubes for televisions and computer monitors. Generally, the performance of these devices can be directly linked to the performance of the phosphors which they incorporate. Thus, in order to promote the evolution of these technologies, it is essential that new phosphors routinely be developed which could be used in those applications.

For cathode ray tube applications, it is necessary that phosphors luminesce when excited by cathode ray radiation (CR), which consists of high energy electrons. Phosphors which are excited by cathode rays are defined as being cathodolumineseent. Although it is desirable that cathodoluminescent phosphors emit light over the entire range of the visible spectrum, phosphors that emit red, green and blue light are particularly important for use in the manufacture of luminescent screens for televisions and computer monitors.

Thus, it would be an advantage in the art to provide novel phosphors which are capable of luminescent emission when excited by external radiation.

SUMMARY OF THE INVENTION

It is an object of this invention to provide an inorganic intercalation phosphor capable of luminescent emission when excited by external radiation.

It is a further object of this invention to provide a method for producing an inorganic intercalation phosphor.

In accordance with one aspect of the invention, there is provided an inorganic intercalation phosphor having the general formula $Na_2(Mg_{3-x}Tb_x)Al_2Si_2O_{10}F_2$, wherein x is is from about greater than 0 to about 0.10.

In accordance with another embodiment of the invention, there is provided an inorganic intercalation phosphor having the general formula $Na_2Mg_3\{(Al_{2-x}Eu_x)Si\}O_{10}F_2$, wherein x is from greater than 0 to about 0.10.

BEST MODE FOR CARRYING OUT THE INVENTION

For a better understanding of the present invention, together with other and further objects, advantages and capabilities thereof, reference is made to the following specification and appended claims.

Figure 1:
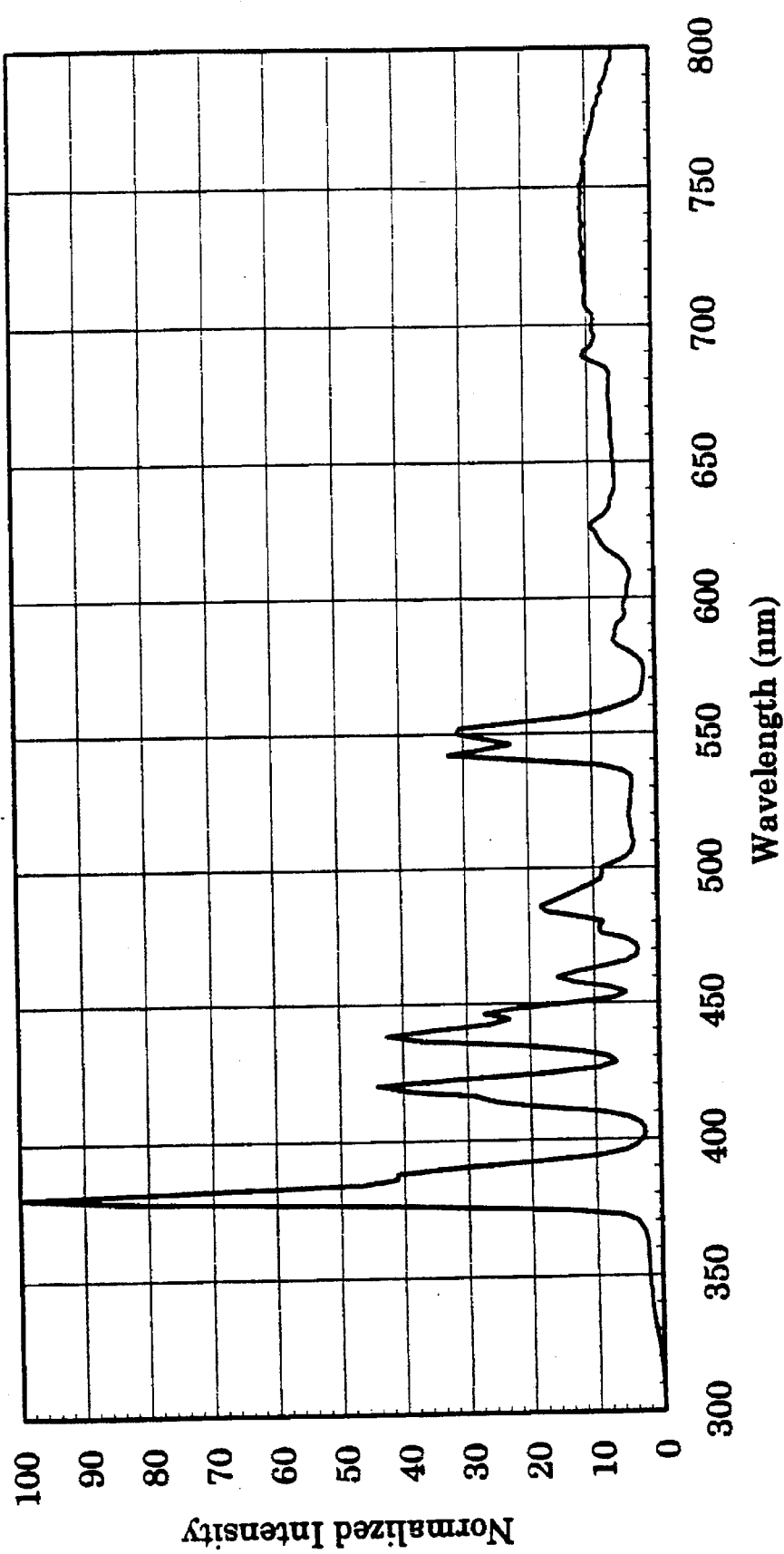
FIG. 1 is a graph of the emission spectrum of a terbium activated phosphor of the invention under cathode ray excitation.

A phosphor of an embodiment of the invention, $Na_2(Mg_{3-x}Tb_x)Al_2Si_2O_{10}F_2$ is luminescent under cathode ray excitation and has sharp peaks centered near 380, 415, 440, and 540 nm, as will be seen from FIG. 1. Color is blue-green. X in the formula varies from greater than 0 to about 0.10.

The phosphor was prepared by mixing appropriate amount of MgO, $SiO_2$, $Na_2CO_3$, $(NH_4)_2SiF_6$, $Al_2O_3$, and $TbF_3$ to achieve the desired formulation. The starting reagents were blended together on a paint-shaker for 20–30 minutes, The starting materials thus mixed were charged into alumina crucibles and fired at 1100° C. for 12–24 hours. The samples were then pulverized, and sieved to form the final product. Each sample was analyzed by using X-ray powder diffraction to ensure that the HCFP product had indeed been formed.

Under photo-excitation (254 mn) the terbium activated HCFP displayed very weak luminescence.

Figure 2:
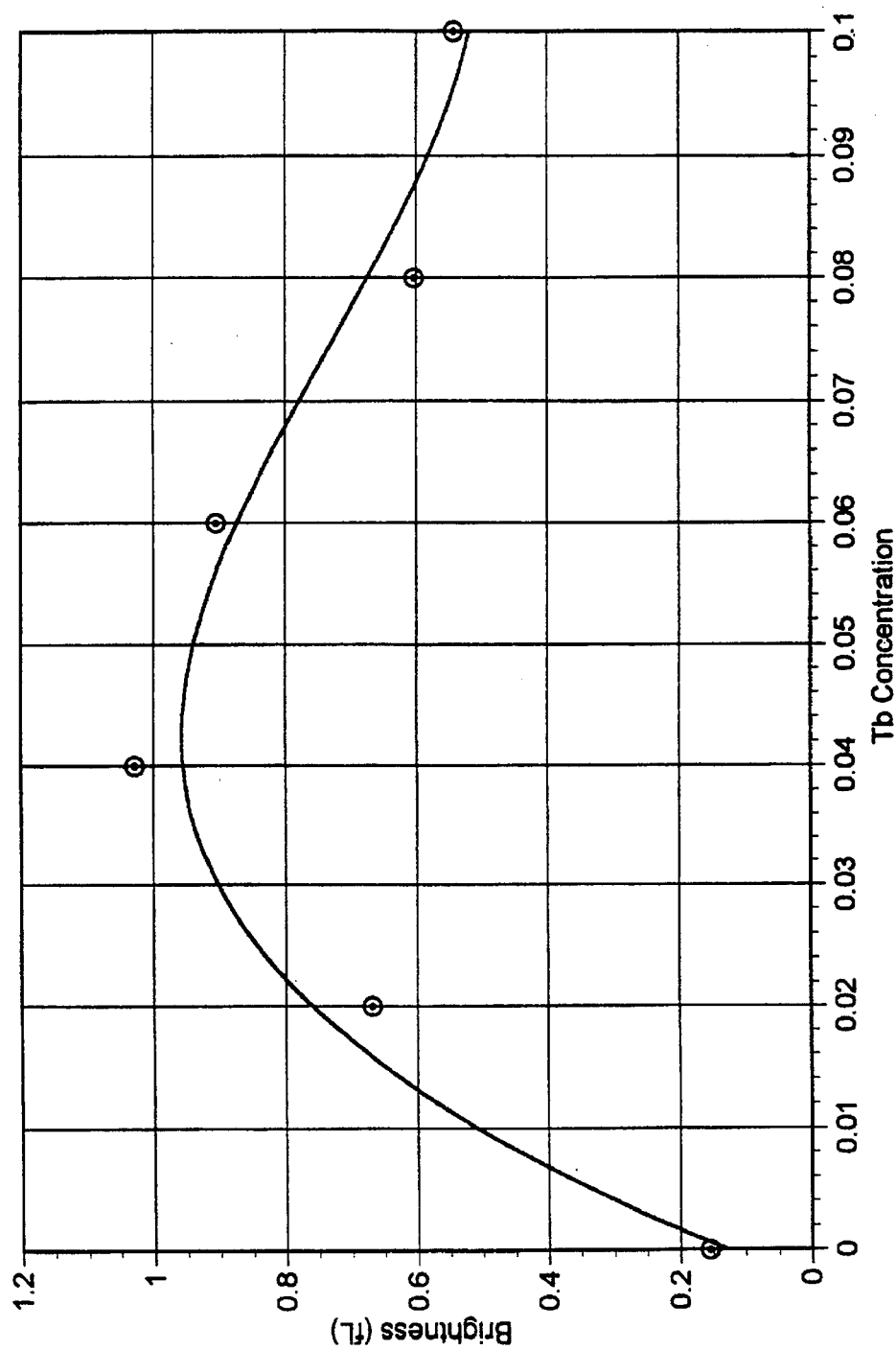
FIG. 2 is a graph of the variation in CR brightness relative to the mount of terbium activator.

The CR emission is shown in FIG. 1. The emission was performed using a focused electron beam, typically at 10 kV, 10 µA, or 15 kV, 8 µA. FIG. 2 illustrates the brightness variation dependent upon the amount of activator.

The following examples, set forth in Table 1, show the real amounts of starting materials used in the reactions to make $Na_2(Mg_{3-x}Tb_x)Al_2Si_2O_{10}F_2$:

TABLE I

|  | Example 1 | Example 2 | Example 3 | Example 4 | Example 5 | Example 6 |
| --- | --- | --- | --- | --- | --- | --- |
| $Na_2CO_3$ | 12.41 | 12.33 | 12.26 | 12.18 | 12.11 | 12.03 |
| MgO | 14.16 | 13.98 | 13.98 | 13.62 | 13.44 | 13.27 |
| $Al_2O_3$ | 11.94 | 11.86 | 11.56 | 11.72 | 11.65 | 11.57 |
| $(NH_4)_2SiF_6$ | 6.95 | 6.91 | 6.87 | 6.82 | 6.78 | 6.74 |
| $SiO_2$ | 11.75 | 11.67 | 11.60 | 11.53 | 11.46 | 11.39 |
| $TbF_3$ | XXX | 0.503 | 1.209 | 1.489 | 1.973 | 2.451 |
| mol Tb/mol phosphor | 0.00 | 0.02 | 0.04 | 0.06 | 0.08 | 0.10 |
| [1]CRT Brightness (fL) | 0.357 | 0.670 | 1.03 | 0.907 | 0.605 | 0.544 |

In another embodiment of the invention, a phosphor has the general formula, $Na_2Mg_3\{(Al_{2-x}Eu_x)Si\}O_{10}F_2$. The phosphor is luminescent under cathode ray excitation and has a sharp peak at centered 610 mn, as will be seen from FIG. 3. The red color is characteristic of tri-valent europium. X in the formula varies from greater than 0 to about 0.10.

The phosphor was prepared by mixing appropriate amount of MgO, $SiO_2$, $Na_2CO_3$, $(NH_4)_2SiF_6$, $Al_2O_3$, and $Eu_2O_3$ to achieve the desired formulation. The general formula indicates that europium is being substituted for aluminum. The starting reagents were blended together on a paint-shaker for 20–30 minutes. The starting materials thus mixed were charged into alumina crucibles and fired at 1100° C. for 12–24 hours. The samples were then pulverized, and sieved to form the final product. Each sample was analyzed by using X-ray powder diffraction to ensure that the HCFP product had indeed been formed.

Under photo-excitation (254 nm) the europium activated HCFP displayed very weak luminescence.

Figure 3:
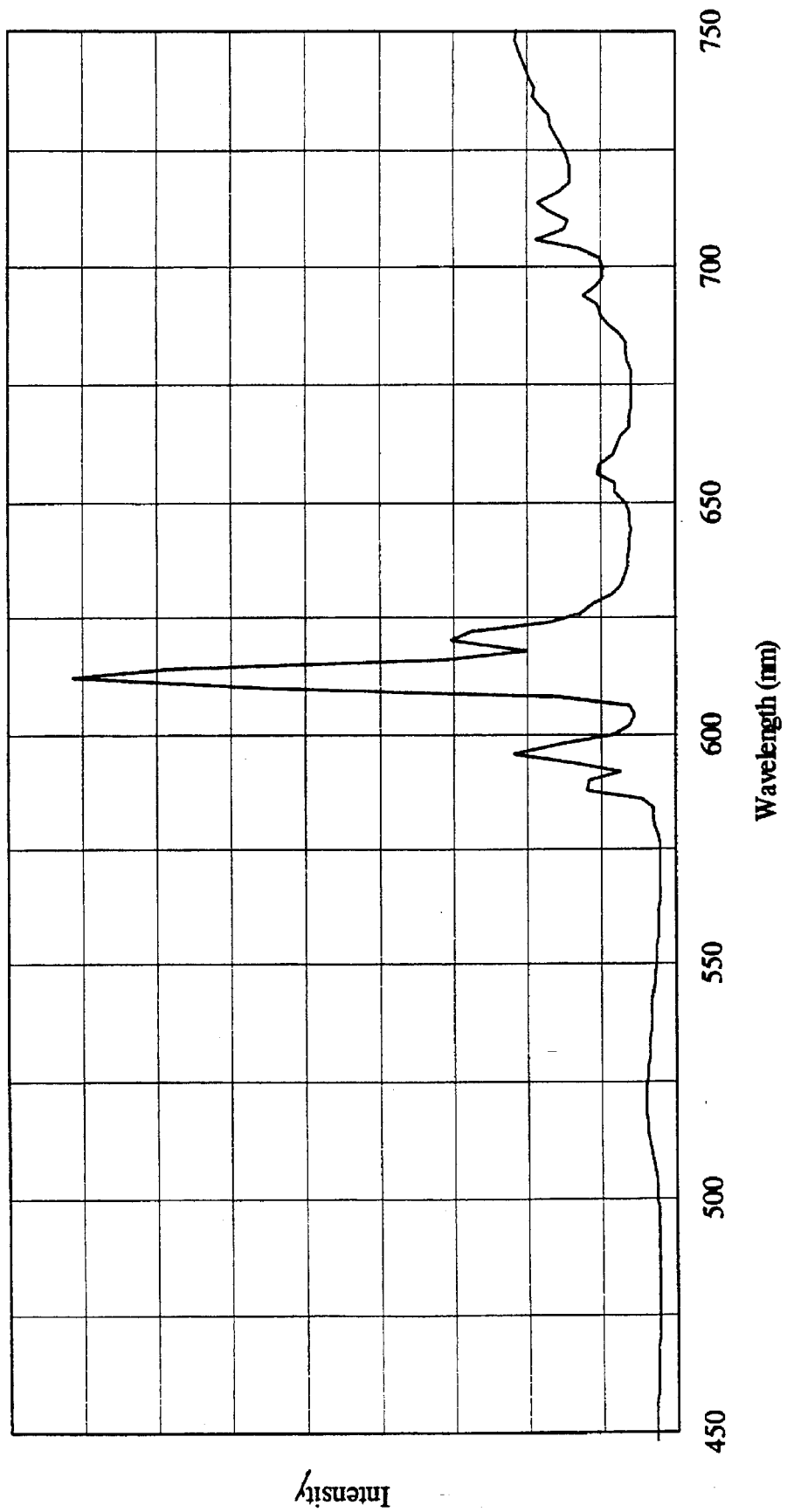
FIG. 3 is a graph of the emission spectrum of an europium activated phosphor of the invention under cathode ray excitation.
Figure 4:
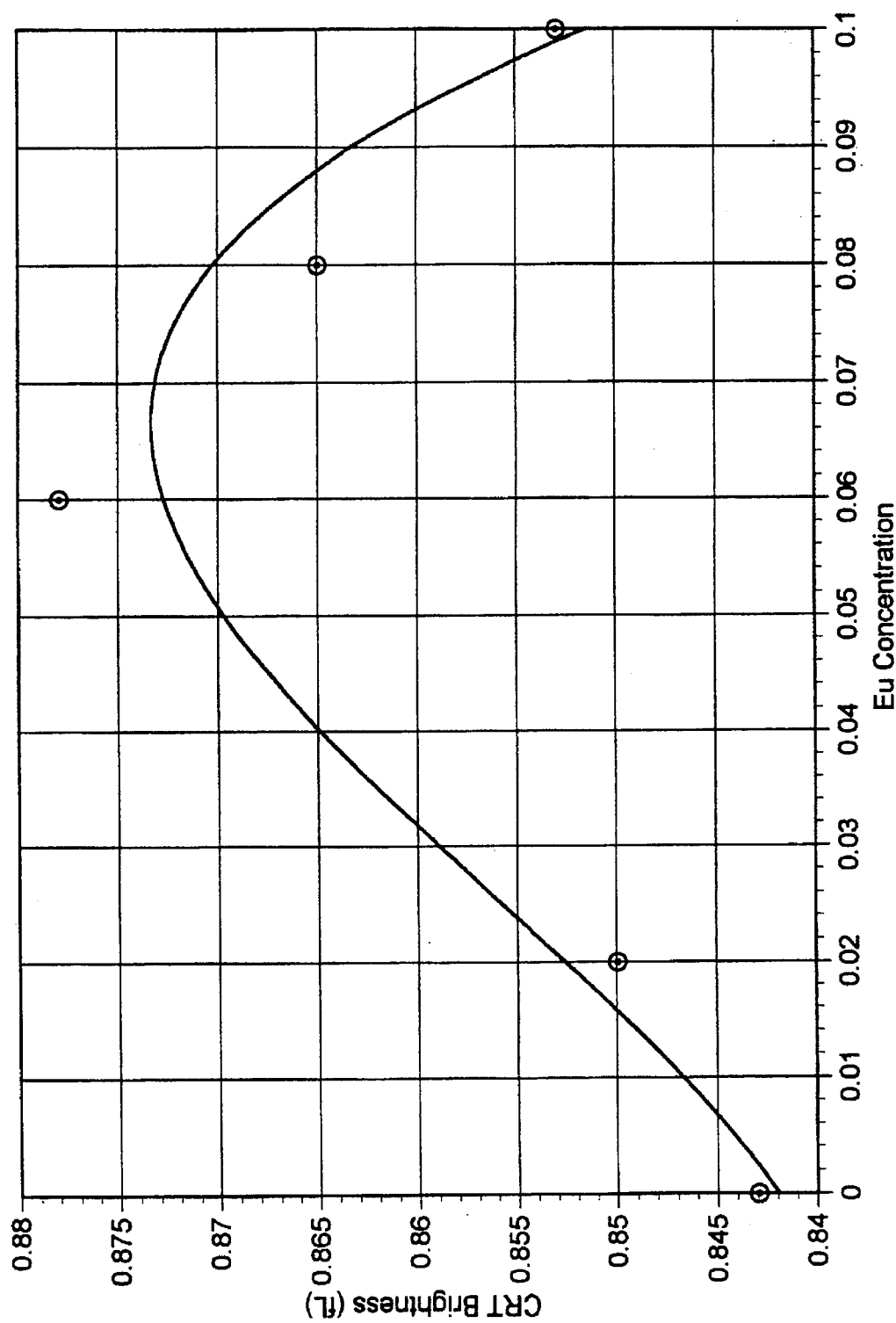
FIG. 4 is a graph of the variation in CR brightness relative to the amount of europium activator.

The CR emission is shown in FIG. 3. The emission was performed using a focused electron beam, typically at 10 kV, 10 μA, or 15 kV, 8 μA. FIG. 4 illustrates the brightness variation dependent upon the mount of activator.

The following examples, set forth in Table II, show the real amounts of starting materials used in the reactions to make $Na_2Mg_3\{(Al_{2-x}Eu_x)Si\}O_{10}F_2$:

TABLE II

|  | Example 1 | Example 2 | Example 3 | Example 4 | Example 5 |
|---|---|---|---|---|---|
| $Na_2CO_3$ | 12.41 | 12.34 | 12.20 | 12.13 | 12.06 |
| MgO | 14.16 | 14.08 | 13.92 | 13.84 | 13.76 |
| $Al_2O_3$ | 11.94 | 11.75 | 11.38 | 11.20 | 11.02 |
| $(NH_4)_2SiF_6$ | 6.95 | 6.91 | 6.83 | 6.79 | 6.76 |
| $SiO_2$ | 11.75 | 11.68 | 11.55 | 11.48 | 11.41 |

TABLE II-continued

|  | Example 1 | Example 2 | Example 3 | Example 4 | Example 5 |
|---|---|---|---|---|---|
| $Eu_2O_3$ | XXX | 0.410 | 1.215 | 1.611 | 2.002 |
| mol Eu/mol phosphor | 0.00 | 0.02 | 0.06 | 0.08 | 0.10 |
| [1]CRT Brightness (fL) | 0.843 | 0.850 | 0.878 | 0.865 | 0.853 |

While there have been shown what are at present considered to be the preferred embodiments of the invention, it will be apparent to those skilled in the art that various changes and modifications can be made herein without departing from the scope of the invention as defined by the appended claims.

We claim:

1. A phosphor having the general formula $Na_2(Mg_{3-x}Tb_x)Al_2Si_2O_{10}F_2$, where x is from greater than 0 to about 0.10.

2. The phosphor of claim I wherein x is about 0.04.

3. A phosphor having the general formula $Na_2Mg_3\{(Al_{2-x}Eu_x)Si\}O_{10}F_2$, wherein x is from greater than 0 to about 0.10.

4. The phosphor of claim 3 wherein x is about 0.06.

5. A phosphor based upon highly charged fluorophlogopite $(Na_2Mg_3(Al_2Si_2)O_{10}F_2)$ activated by terbium or europium.

* * * * *